United States Patent
Mullen

(10) Patent No.: US 7,095,841 B2
(45) Date of Patent: Aug. 22, 2006

(54) QUEUED TASK/QUEUED RESOURCE STATE FORECASTER

(75) Inventor: David C. Mullen, Newcastle, WA (US)

(73) Assignee: Avaya Technology Corp., Basking Ridge, NJ (US)

( * ) Notice: Subject to any disclaimer, the term of this patent is extended or adjusted under 35 U.S.C. 154(b) by 931 days.

(21) Appl. No.: 10/109,760

(22) Filed: Mar. 29, 2002

(65) Prior Publication Data

US 2003/0185378 A1    Oct. 2, 2003

(51) Int. Cl.
*H04M 3/00* (2006.01)

(52) U.S. Cl. .............................. 379/265.1; 379/266.06; 379/266.08; 379/309; 707/1; 707/3; 707/4; 707/5; 707/6; 718/100; 718/102; 718/104; 705/7; 705/8; 705/10; 705/11

(58) Field of Classification Search ............. 379/265.1, 379/266.06, 266.08, 309; 707/1, 3–6; 718/100, 718/102, 104; 705/7, 8, 10, 11
See application file for complete search history.

(56) References Cited

U.S. PATENT DOCUMENTS

| | | | |
|---|---|---|---|
| 4,959,686 A | | 9/1990 | Spallone et al. ............... 705/26 |
| RE36,416 E | * | 11/1999 | Szlam et al. ............. 379/88.09 |
| 6,393,433 B1 | * | 5/2002 | Kalavade et al. ........... 707/200 |
| 6,778,643 B1 | * | 8/2004 | Bushey et al. ........... 379/88.18 |
| 6,816,798 B1 | * | 11/2004 | Hill, III et al. ............... 702/84 |

FOREIGN PATENT DOCUMENTS

| | | |
|---|---|---|
| EP | 0 899 673 A | 3/1999 |
| JP | 2000020832 | 1/2000 |
| WO | 97 15136 A | 4/1997 |

\* cited by examiner

*Primary Examiner*—Quynh H. Nguyen
(74) *Attorney, Agent, or Firm*—David Volejnicek

(57) ABSTRACT

A queued task/queued resource state forecaster employs a binomial distribution fitter to fit a composite binomial distribution to operational data of a work management system, such as a call center. The fitter obtains arrival statistics for calls and agents in the call center, determines moments for the net calls in-queue from the obtained arrival statistics, determines parameters of binomial distributions that corresponds to the moments, and fits the determined moments to a linear combination of offset binomial distributions to obtain a composite binomial distribution. The composite binomial distribution is then evaluated by a scheduler which adjusts the operation of the call center accordingly. For example, a task scheduler evaluates the distribution to obtain a probability of an additional call being enqueued by the future point in time in order to determine whether an outbound call should be launched. Or, a resource scheduler evaluates the distribution to obtain an expected number of enqueued calls at some future point in time in order to determine whether another agent should be dispatched.

39 Claims, 12 Drawing Sheets

US 7,095,841 B2

QUEUED TASK/QUEUED RESOURCE STATE FORECASTER

TECHNICAL FIELD

This invention relates to work management systems in general and to communications-serving and -distributing systems in particular.

BACKGROUND OF THE INVENTION

Work management systems, including call management systems, work distributor systems, and automatic call distribution (ACD) systems, distribute work items—whether tangible or intangible, and referred to herein as tasks—for servicing to resources, such as processing machines or call-center agents. In order to operate efficiently, work management systems must anticipate when resources will become available to serve a new task, so that they can have a task ready for a resource as soon as the resource becomes available and preferably no earlier. Otherwise, tasks such as calls must wait in queue for resources to become available, to the dissatisfaction of the callers, or resources sit idle while awaiting tasks to become available, to the detriment of operating efficiency of the system.

Work management systems often do not use an accurate forecast of the future availability of presently-unavailable resources. In these kinds of systems, resources are presently unavailable because they are performing tasks that are designated to be uninterruptible. That is, a resource can serve only one task at a time and cannot start a new task until the present task is completed. Additionally, only one resource can usually be assigned to a particular task. Illustrative such tasks involve live clients in transactions such as telephone calls. Background tasks may be dynamically interspersed amongst them. Resources that are presently handling tasks are rendered presently unavailable. However, each unavailable resource can be expected to complete its task within a future time interval with a determinable probability. This expectation for the "arrival" of a resource can be based upon its time-in-state and the particular operational characteristics of the type of task which the resource is serving.

Typically, automatic systems forecast the arrival of new tasks better than they forecast the arrival of resources to serve them. For example, one known call-management system does not use dynamic forecasts at all. Instead, its prediction algorithm triggers the initiation of new outgoing calls (tasks) for each agent (resource) after the agent has been in the 'work' or 'update' state for a relatively-fixed amount of time. The system does not compute a probability of task completion for agents, either collectively or individually. This results in low agent utilization, and in high client-nuisance rates due to clients' time spent waiting in queue and client-abandoned calls.

A task-acquisition subsystem should strive to keep resources busy serving tasks at all times. For example, an outbound dialer should initiate outbound calls based upon the aggregate availability of agents. The time horizon for this determination should be close to the amount of time that it takes to get the called party to answer an incremental outbound call. Then outbound calls can be initiated to generate a demand for service that appropriately reduces the gap between the supply of agents and the demand for them.

An automatic call distributor or work distributor dispatches a resource to serve lower-priority tasks when the supply of resources exceeds by some selected amount the demand for service by higher-priority tasks, and vice versa. In this case, the relevant time horizon for a forecast is close to the amount of time in which a resource could be assigned to the lower-priority tasks.

SUMMARY OF THE INVENTION

This invention is directed to solving these and other problems and meeting these and other requirements of the prior art.

This invention is about operationally determining an effective measure of the match between the supply of resources and the demand for resources. Such a measure can be compared with task-service delay and utilization goals for control systems in automatic dialers and workflow systems. It can be used for automatic allocation of resources and for automatic initiation of tasks, such as pacing of outbound calls in a predictive dialer.

The invention provides a forecast at some point in time of the net number of enqueued tasks. The net number of enqueued tasks is the number of tasks that have become available less the number of resources that have become available. It is a measure of the match between the supply of agents and the demand for agents.

According to one aspect of the invention, a method of operating a work management system comprises the following activities: obtaining arrival statistics for tasks and resources in the work management system, determining moments (e.g., mean, variance, skewness) for the net tasks in queue from the obtained arrival statistics, determining a binomial distribution that corresponds to the moments, fitting the determined moments to a linear combination of binomial distributions to obtain a composite binomial distribution, and evaluating the composite binomial distribution to determine an expected number of enqueued tasks or resources at the future point in time. This number may be used to derive the expected queuing rate, answer delay, service level, etc. Based on the expected number (including its derivatives), the operation of the work management system is then adjusted.

According to another aspect of the invention, a method of operating a work management system comprises the following activities: obtaining arrival statistics for tasks and resources in the work management system, determining moments for the net tasks in queue from the obtained arrival statistics, adjusting the determined moments by a probability of either an additional task or an additional resource arriving by the future point in time, determining a binomial distribution corresponding to the adjusted moments, fitting the determined adjusted moments to a linear combination of binomial distributions to obtain a composite binomial distribution, evaluating the composite binomial distribution to obtain a probability of the additional task or resource being enqueued by the future point in time (or its derivatives), and adjusting operation of the work management system based on the probability (including on its derivatives).

Illustratively, determining the moments for the net tasks in queue comprises determining a mean, a variance, and a skewness for the net tasks in queue. Determining a binomial distribution that corresponds to those moments then illustratively comprises determining ideal parameters of the binomial distribution that fit the (adjusted) moments and determining from the ideal parameters at least one set of realistic parameters of the binomial distribution that fit the (adjusted) moments. Fitting the determined moments to a linear combination of binomial distributions then illustratively comprises determining linear combinations (if any exist) of pairs of binomial distributions having the realistic parameters that eliminate error in the (adjusted) variance, selecting linear combinations (if any exist) that yield the smallest errors in the (adjusted) skewness, determining a linear combination (if any exists) of the selected linear combinations that minimizes error in the (adjusted) skewness, and determining weights of the binomial distributions of the selected linear combinations that effect the composite binomial distribution.

For any server-allocation or call-generation decision, a "what-if" estimate can be automatically performed on the contemplated action. The "what-if" determines a queue-state forecast, which is used to determine if the contemplated action should be invoked at that time.

The method is illustratively useful for automation of resource allocation and various dispatching operations, especially in an environment of differentiated tasks and differentiated resources where control of expeditious service is required for some of the tasks. The method can facilitate the integration of back-office work with front-office call-handling work, including the integration of outbound call systems with workflow systems.

This method is illustratively significant because it enables the realization of high service levels and high utilization of resources simultaneously. It can be used to improve customer service and to reduce the burden on supervision in work-processing centers, including call centers. A predictive dialer may use this method to avoid annoying call recipients with outbound calls for which no agent will be available to service them. A workflow system can use this method to ensure that it does not assign an available resource to low-priority work when the resource should be dedicated to higher-priority work.

While the invention has been characterized in terms of method, it also encompasses apparatus that performs the method. The apparatus preferably includes an effector—any entity that effects the corresponding step, unlike a means—for each step. The invention further encompasses any computer-readable medium containing instructions which, when executed in a computer, cause the computer to perform the method steps.

BRIEF DESCRIPTION OF THE DRAWING

These and other features and advantages of the invention will become more apparent from the following description of an illustrative embodiment of the invention considered together with the drawing wherein.

DETAILED DESCRIPTION OF AN ILLUSTRATIVE EMBODIMENT

Reference will now be made in detail to the illustrative embodiment of the invention, which is illustrated in the accompanying drawing. While the invention will be described in conjunction with the illustrative embodiment, it will be understood that it is not intended to limit the invention to this embodiment. On the contrary, the invention is intended to cover alternatives, modifications, and equivalents, which may be included within the invention as defined by the appended claims.

Figure 1:
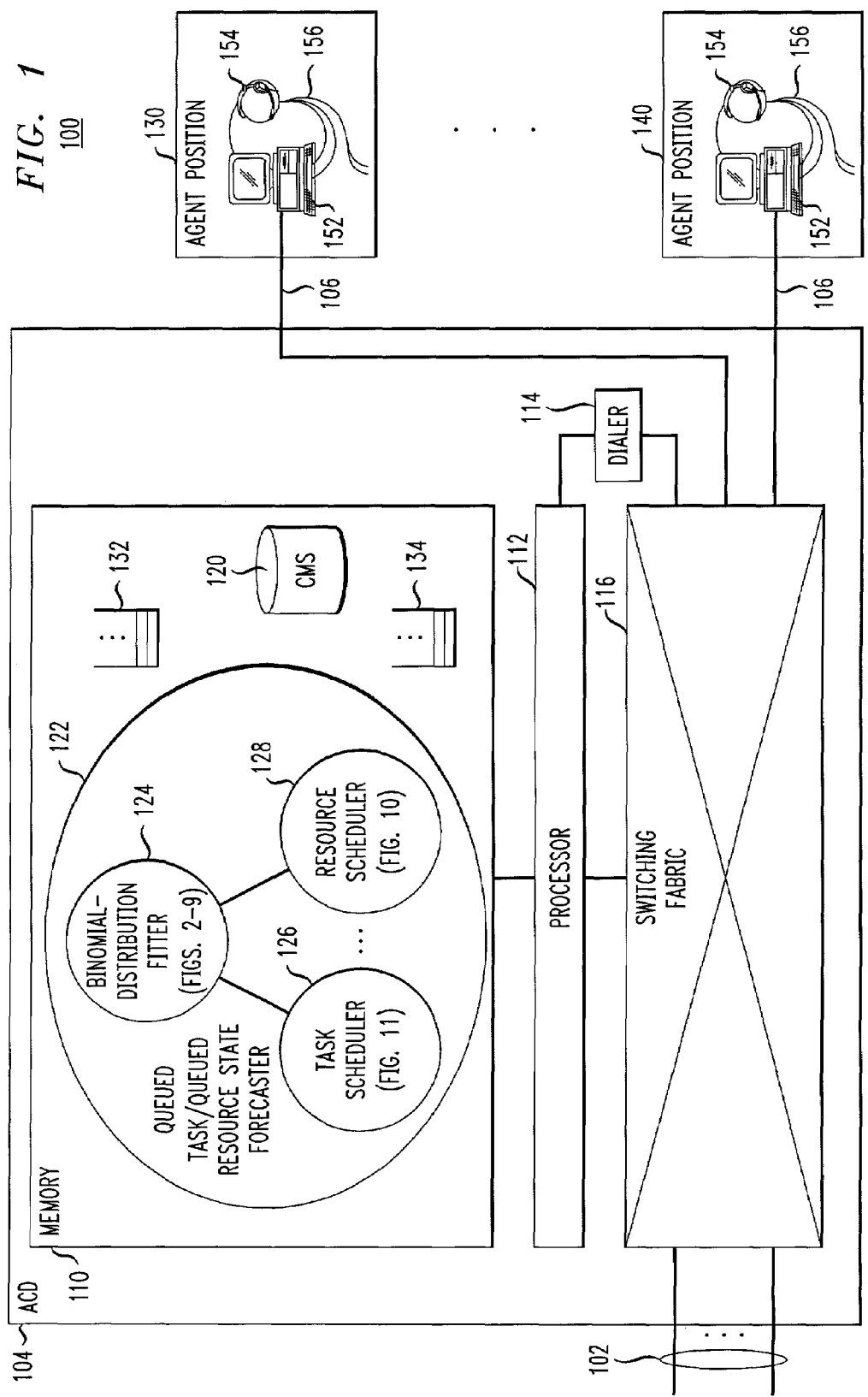
FIG. 1 is a block diagram of a call center that includes an illustrative embodiment of the invention.

FIG. 1 shows an illustrative call center 100 for servicing inbound and outbound calls. The word "call" is used herein generically to mean any communication or request for expeditious service. Call center 100 comprises an automatic call distributor (ACD) 104 that interconnects agent positions 130–140 via calls with the outside world to which it is connected by communications trunks 102. ACD 104 includes a switching fabric 116 that selectively interconnects trunks 102 with communications lines 106 that extend to agent positions 130–140. ACD 104 is a stored program-controlled apparatus that operates under control of a processor 112 that obtains data from and stores data in, and executes stored programs out of, memory 110 or any other computer-readable medium. Data in memory 110 include historical and operational data of ACD 104 and agents 156, which are stored in a call management system (CMS) 120 database. Processor 112 controls operation of switching fabric 116 and of a dialer 114 that generates outgoing calls on trunks 102 through switching fabric 116. Each agent position 130–140 includes a terminal 152, such as a personal computer, and a voice communications device, such as a telephone or a headset 154, for use by an agent 156. Call queues 132 enqueue calls that are waiting to be serviced. Agent queues 134 enqueue agents who are free and available to service calls. As described so far, call center 100 is conventional.

For purposes of the following discussion, a call, whether incoming or outgoing, constitutes a task to be served, and an agent position 130–140 that is presently staffed by an agent 156 constitutes a resource for serving tasks. According to the invention, memory 110 of ACD 104 includes a queued task/queued resource state forecaster 122 program. Forecaster 122 predicts the net number of tasks that are likely to be enqueued, awaiting service, at some point in time. The net number of enqueued tasks is the number of tasks (e.g., calls) that have arrived (become available for servicing) less the number of resources (e.g., agents) that have arrived (become free and available to service tasks). Forecaster 122 functions by getting moments for the net tasks in queue, fitting the associated moments to a linear combination of offset binomial distributions, and evaluating the binomial distributions to determine the expected queuing rate, service (e.g., call-answer) delay, service level, etc. For any task-generation or resource-allocation decision, forecaster 122 automatically performs a "what-if" evaluation of the contemplated action. The "what-if" determines a queue-state forecast, which forecaster 122 uses to determine if it should invoke the contemplated action at that time.

Forecaster 122 comprises a binomial-distribution fitter 124 and one or more schedulers 126–128, including a task scheduler 126 and/or a resource scheduler 128. Fitter 124 fits a composite binomial distribution to operational data of call center 100. The binomial distribution gives the probability P of exactly k successes when n trials are attempted with a probability of an individual success of p, as $$P(k) = \frac{n! p^k (1-p)^{n-k}}{k!(n-k)!}.$$

Schedulers 126–128 evaluate the fitted binomial distribution to decide whether or not to initiate tasks (e.g., outbound calls) or to assign resources (e.g., assign agents to particular work).

The configuration and operation of binomial-distribution fitter 124 is shown in FIGS. 2–9 and is described in conjunction therewith.

Fitter 124 fits binomial distributions to statistics for the expected net number of calls in queue. The expected net number of calls in queue is the expected number of agents that will have become available within a time horizon (by some selected future point in time) less the expected number of calls that have arrived by that point in time. A positive value of the net number of calls in queue means that calls are waiting in queue 132, while a negative value of net calls in queue means that agents are waiting in queue 134. To perform the fit, upon its invocation at step 200 of FIG. 2, fitter 124 first gets the central moments for the net number of calls in queue, at step 202. (Alternatively, moments about zero could be used instead.) This is illustrated in FIG. 3. Fitter 124 first computes the moments for the net number of calls in queue as a function of the moments for call arrivals and agent arrivals, at steps 302–306. The first central moment, which is the net expected value or mean E of the net calls in queue, is computed as the expected value $E_C$ of call arrivals less the expected value $E_A$ of agent arrivals, at step 302. $E_C$ represents the combined expected value of new call arrivals consisting of both incoming (inbound) and outgoing (outbound) calls. The incoming component of $E_C$ is the expected number of inbound calls to be received by the future point in time (within a horizon interval h from now), determined from historical data. The outgoing component of $E_C$ is the expected number of outbound call attempts that result in being answered by a called party within the horizon interval, determined from historical "hit rates". The outgoing component of $E_C$ is computed as the sum of probabilities of individual outbound call attempts resulting in a "hit" on (answer by) a called party within the horizon interval. Likewise, the expected value $E_A$ of agent arrivals is the sum of probabilities of individual agents becoming available within the horizon interval; it represents the magnitude of agent arrivals. $E_A$ is illustratively determined as described in U.S. application Ser. No. 09/872,188, filed on Jun. 1, 2001, entitled "Arrangement For Forecasting Timely Completion Of A Task By A Resource", which is hereby incorporated herein by reference. The second central moment, which is the variance V about the mean E of net calls in queue, is computed as the variance $V_C$ of call arrivals plus the variance $V_A$ of agent arrivals, at step 304. $V_C$ is the sum of the individual variances in arrival for individual outbound and inbound calls. $V_A$ is the sum of the individual variances in arrival (becoming available) of individual agents. Such an individual variance is determined by p (1–p), where either p is the probability of a "hit" (i.e., being answered by the called party) for an outbound call or p is the probability of agent arrival for an agent. The third central moment, which is the skewness S about the mean E of net calls in queue, is computed as the skewness $S_C$ of call arrivals less the skewness $S_A$ of agent arrivals, at step 306. $S_C$ is the sum of the individual third moments of arrival for each outbound call plus the third moment for each inbound call, and $S_A$ is the sum of the individual third moments of arrival for each agent. Such an individual third moment is determined by p (1–p)(1–2p), where either p is the probability of a "hit" for an outbound call or p is the probability of agent arrival for an agent.

Figure 4:
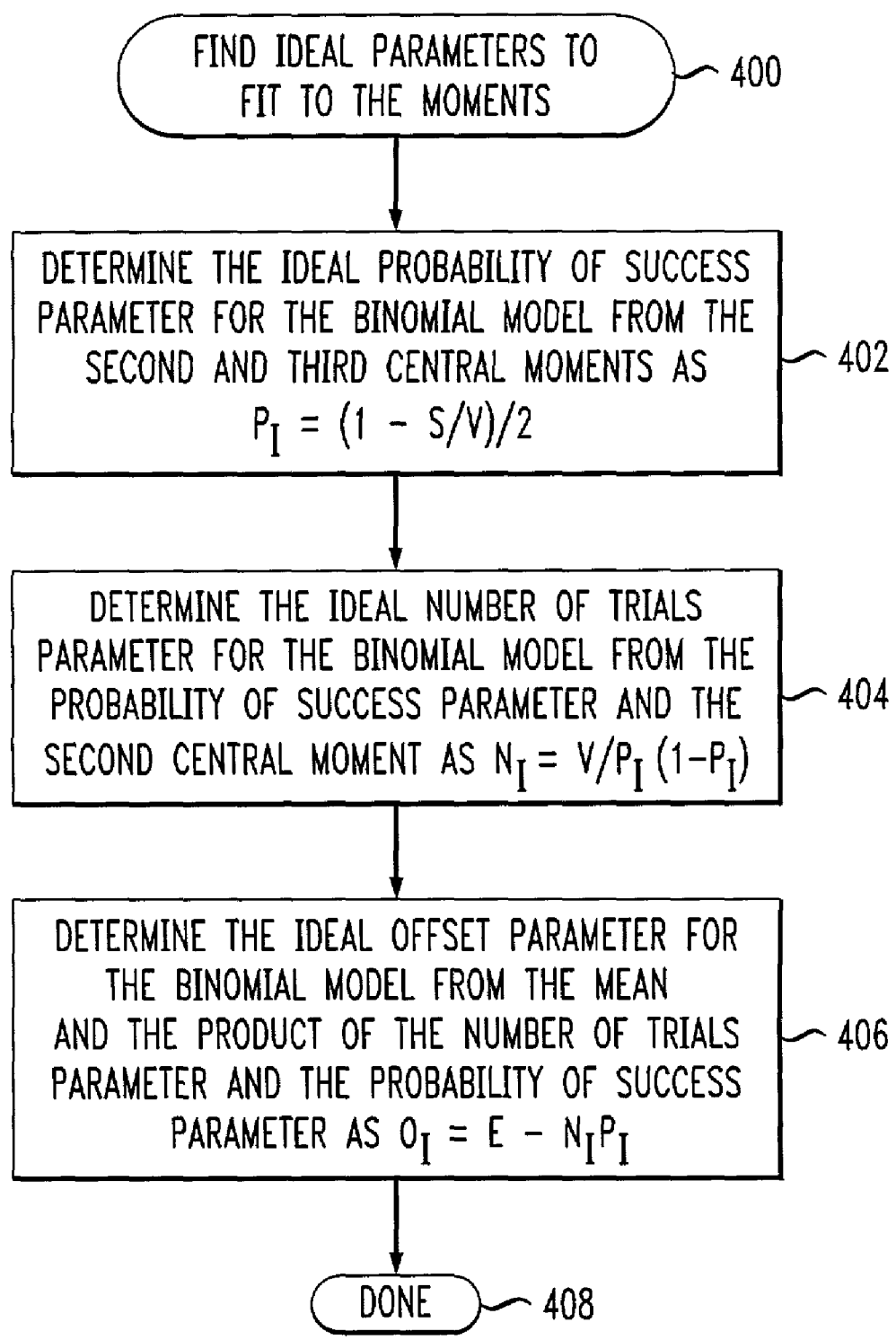

Returning to FIG. 2, fitter 124 finds ideal parameters of the binomial probability model to ideally fit to the central moments, at step 204. This is illustrated in FIG. 4. Conventionally, the binomial probability model has two parameters: the probability of success and the number of trials. A value $P_1$ of the ideal probability of success is determined at step 402 as $P_1=(1-S/V)/2$. A value of $N_1$ of the ideal number of trials is determined at step 404 as $N_1=V/P_1(1-P_1)$. Additionally, a value $0_1$ of a third parameter, an ideal offset parameter, is determined at step 406 as $0_1=E-N_1P_1$.

Figure 2:
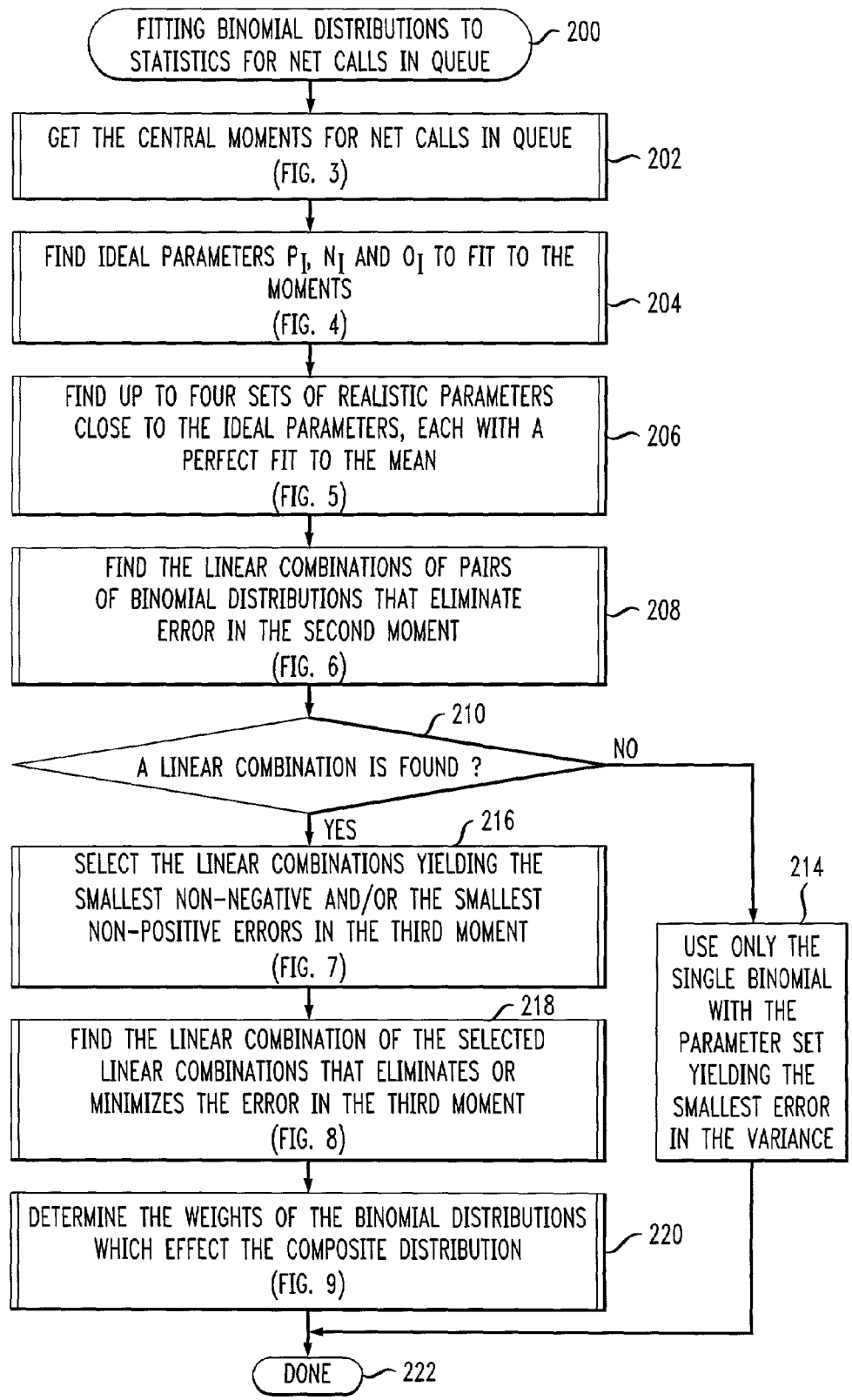
FIGS. 2–9 are a functional diagram of a binomial-distribution fitter of a queued task/queued resource state forecaster of the call center of FIG. 1.
Figure 3:
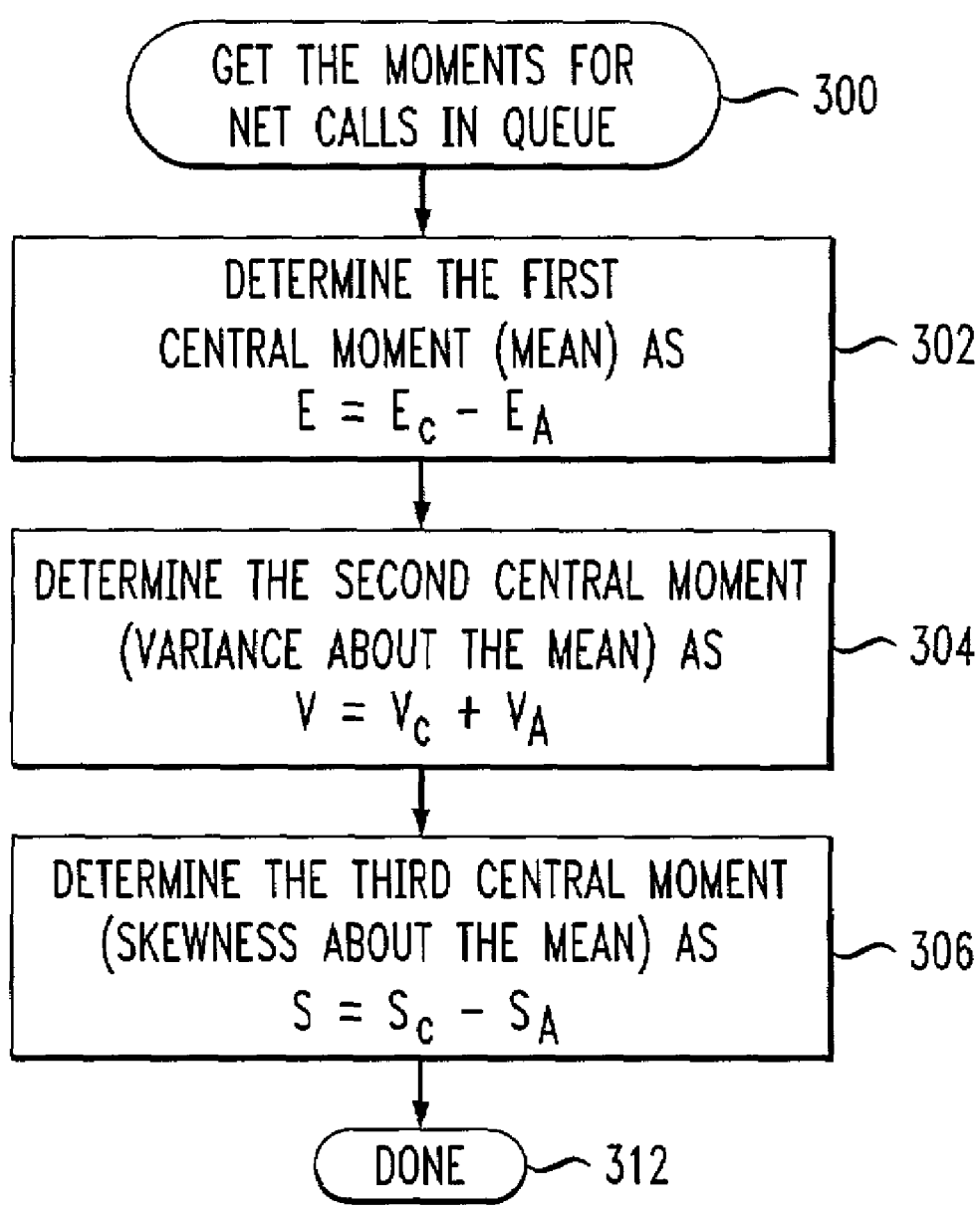
Figure 5:
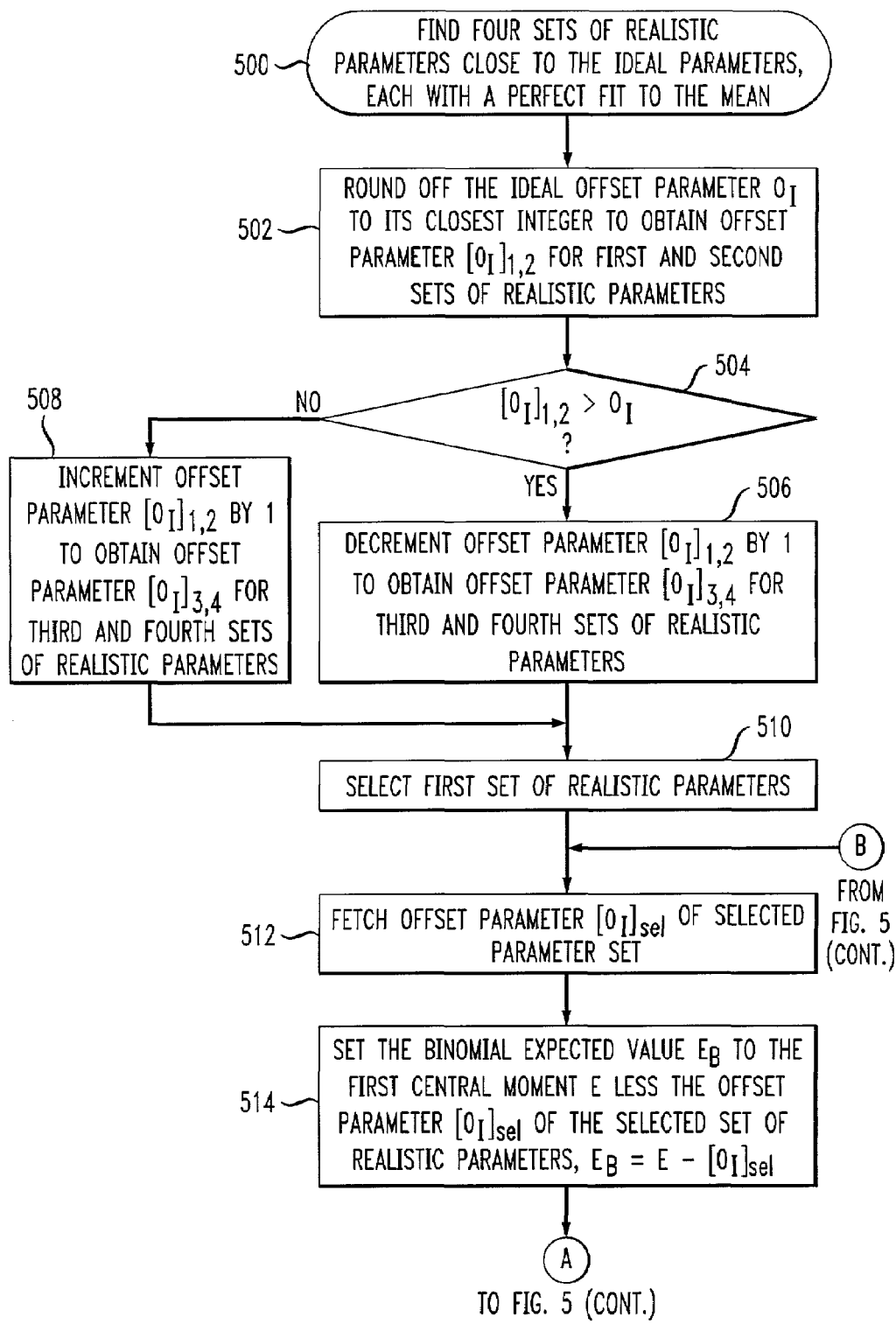
Figure 5:
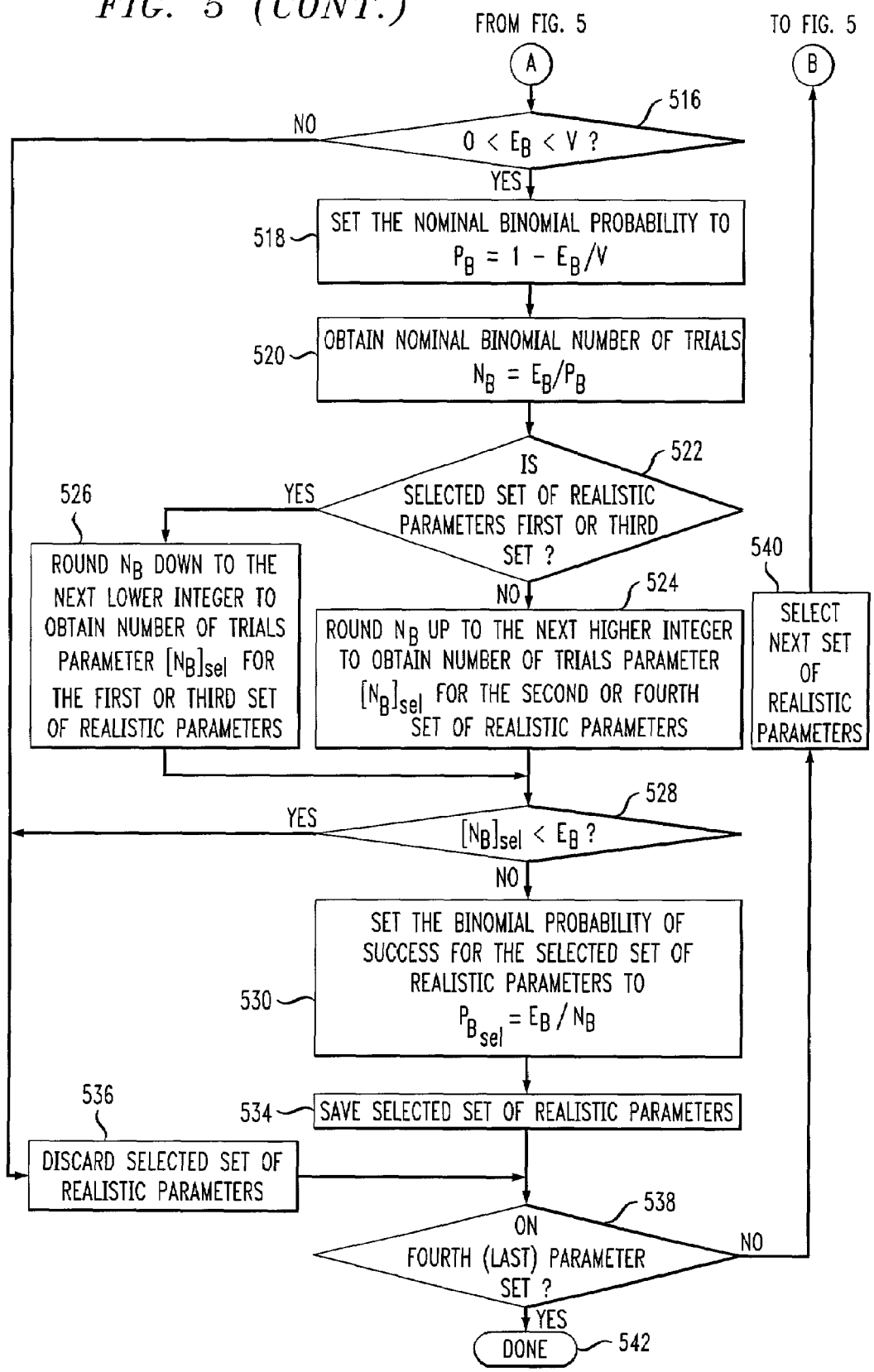

The values of the ideal parameters for the number of trials and the offset found at step 204 of FIG. 2 are not necessarily integers. But the binomial distribution requires its number of trials parameter to be a positive integer, and its offset parameter to be an integer. Therefore, fitter 124 proceeds, at step 206, to find up to four sets of realistic (i.e., with integer offset and number of trials) parameters close to the ideal parameters and each with a perfect fit to the mean. This is illustrated in FIG. 5. First, fitter 124 rounds off the value of the ideal offset parameter $0_1$ to its closest integer value, thereby to obtain offset parameter value $[0_1]_{1,2}$ for a first and a second set of realistic parameters, at step 502. "[ ]" is used herein to represent the integer function. Fitter 124 then checks whether this offset parameter $[0_1]_{1,2}$ value is greater than the ideal offset parameter value $0_1$, at step 504. If not, fitter 124 increments the integer offset parameter value $[0_1]_{1,2}$ by one, at step 508; if so, the fitter 124 decrements the integer offset parameter value $[0_1]_{1,2}$ by one, at step 506. Fitter 124 thereby obtains an offset parameter value $[0_1]_{3,4}$ for a third and a fourth set of realistic parameters. Fitter 124 selects the first realistic parameter set, at step 510, obtains the offset parameter value $[0_1]_{sel}$ for the selected parameter set, at step 512, and sets a binomial expected value $E_B$ to the mean E (see step 302 of FIG. 3) less the offset parameter value $[0_1]_{sel}$ for the selected parameter set, at step 514. Fitter 124 now checks whether the binomial expected value $E_B$ is greater than zero but less than the variance V (see step 304 of FIG. 3), at step 516. If not, fitter 124 discards the selected parameter set, at step 536. But if the binomial expected value $E_B$ is greater than zero and less than the variance V, fitter 124 computes a nominal binomial probability $P_B$ as $P_B=1-(E_B/V)$, at step 518, and computes a nominal binomial number of trials as $N_B=E_B/P_B$, at step 520. Fitter 124 then checks whether the selected set of realistic parameters is the first or the third set, at step 522. If so, fitter 124 rounds the nominal binomial number of trials $N_B$ down to the next lower integer to obtain the offset binomial number of trials $[N_B]_{sel}$ for the first or the third set of realistic parameters, at step 526; if not, the system rounds $N_B$ up to the next higher integer to obtain the offset binomial number of trials $[N_B]_{sel}$ for the second or the fourth set of realistic parameters, at step 524. Fitter 124 thereby obtains values $[N_B]$ for the number of trials parameter for the four sets of realistic parameters. Next, fitter 124 checks whether the value of the number of trials parameter, $[N_B]_{sel}$, for the selected set of realistic parameters is less than the binomial expected value $E_B$, at step 528. If so, fitter 124 discards the selected set of realistic parameters, at step 536; if not, fitter 124 computes the binomial probability $P_{B_{SEL}}$ of success parameter for the selected set of realistic parameters as $P_{B_{SEL}}=E_B/N_B$, at step 530. Fitter 124 then saves the computed values of the selected set of realistic parameters, at step 534. Following step 536 or 534, fitter 124 checks if the selected set of realistic parameters is the fourth set, at step 538. If not, fitter 124 selects the next set of realistic parameters, at step 540, and returns to step 512. If the selected set is the fourth set, selection of realistic parameter sets is completed. At least one set of realistic parameters is sure to have been found, and fitter 124 returns the found sets to FIG. 2, at step 542.

Figure 6:
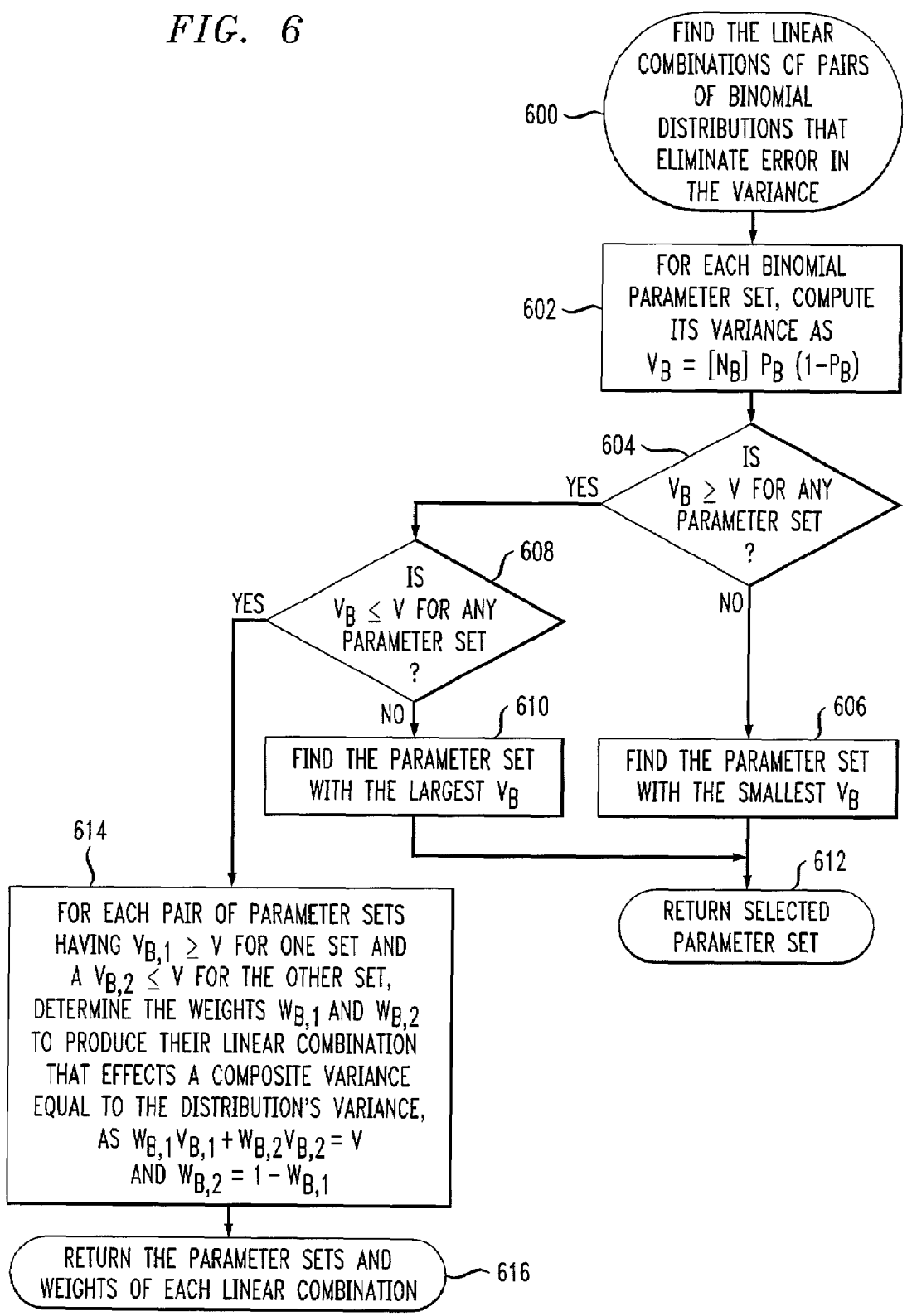

Fitter 124 now uses the returned sets of realistic parameter values to find any weighted pairs (referred to as linear combinations) of binomial distributions that eliminate error in the variance V (the second moment) of the distribution, at step 208. This is illustrated in FIG. 6. For each set of realistic parameter values that were returned at step 206, fitter 124 computes a binomial variance $V_B$ as $V_B=[N_B]P_B(1-P_B)$, at step 602. It then checks whether $V_B$ for any of the sets of realistic parameter values is greater than or equal to the variance V of the distribution (see step 304 of FIG. 3), at step 604. That is, it checks whether the error $(V_B-V)$ of parameter binomial variance $V_B$ is non-negative. If not, fitter 124 finds the set of realistic parameters with the smallest $V_B$, i.e., the parameter set that has the smallest error in the variance, at step 606, and returns this parameter set, at step 612. If $V_B$ for any of the sets of realistic values is greater than or equal to the distribution variance V, fitter 124 checks whether $V_B$ for any of the sets of realistic parameter values is smaller than or equal to V, at step 608. That is, it checks whether the error of the parameter variance $V_B$ is non-positive. If not, fitter 124 finds the set of realistic parameters with the largest $V_B$, i.e., the parameter set that has the smallest error in the variance, at step 610, and returns this parameter set, at step 612. If $V_B$ for any of the sets of realistic parameter values is less than or equal to the distribution variance V, fitter 124 creates all possible pairs (linear combinations) of sets of realistic parameter values such that $V_B$ of one set of the pair is greater than or equal to V (i.e. $V_{B,1} \geq V$) and $V_B$ of the other pair is less than or equal to V (i.e. $V_{B,2} \leq V$), at step 614. That is, pairs of binomial distributions are selected with errors in their variances having opposite signs. The parameters of each of these pairs can be joined in a linear combination so as to effect a composite error of zero in the variance. So, for each of these pairs of sets, fitter 124 determines the weights $W_B$ of their linear combination that make their composite variance equal to the distribution's variance V, also at step 614. The linear combination of the parameter sets is expressed as $W_{B,1}V_{B,1}+W_{B,2}V_{B,2}=V$ where $0 \leq W \leq 1$. Hence, the weights $W_B$ are expressed as $W_{B,1}=(V-V_{B,2})/(V_{B,1}-V_{B,2})$ and $W_{B,2}=(V-V_{B,1})/(V_{B,2}-V_{B,1})$, whereby $W_{B,2}=1-W_{B,1}$. Fitter 124 then returns each parameter set and its weights W of each linear combination, at step 616.

Figure 7:
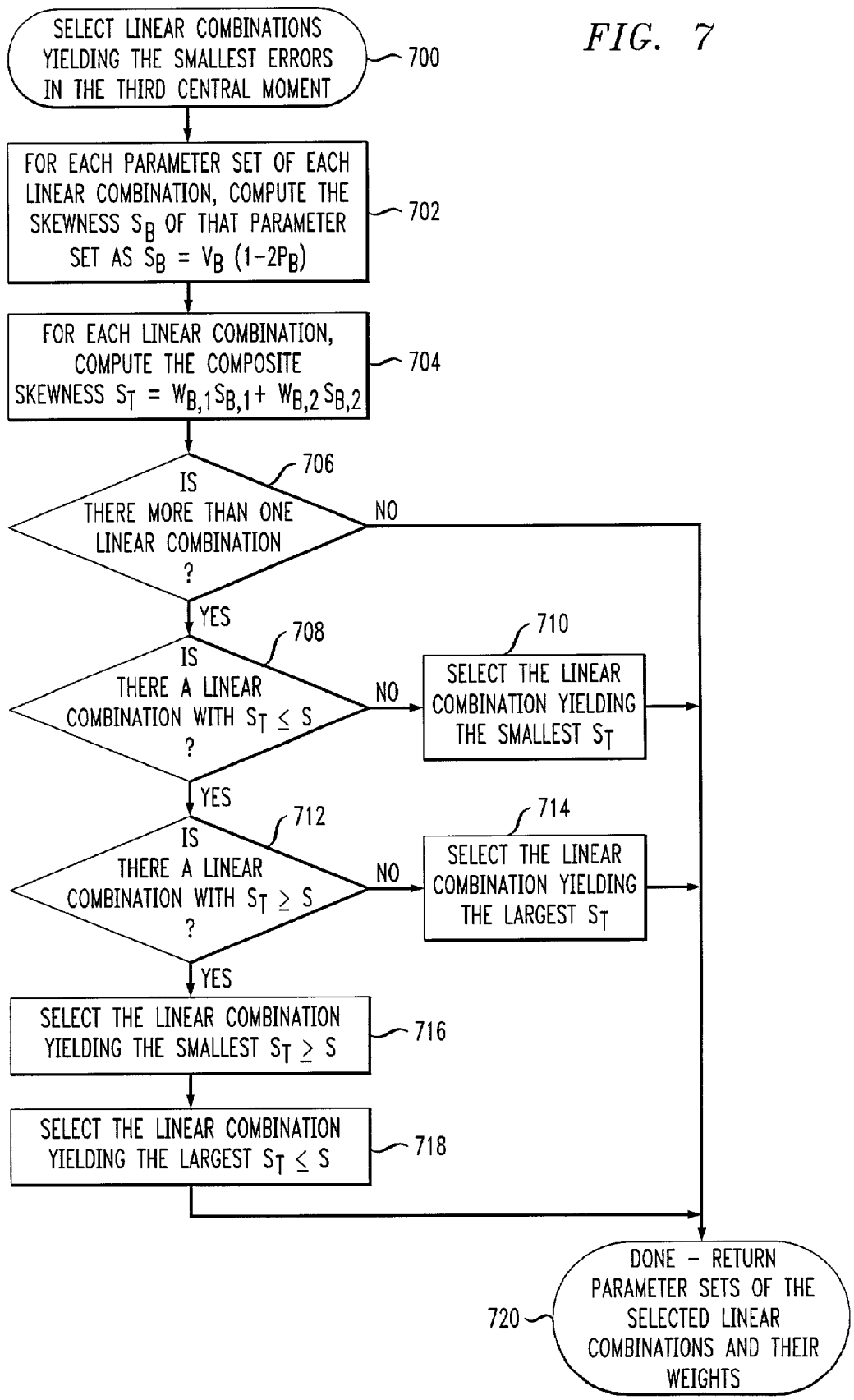

Fitter 124 checks the results returned from FIG. 6, at step 210 of FIG. 2. If a linear combination of pairs of binomial distributions that eliminates error in the variance V of the distribution has not been found (i.e., only one parameter set was returned from step 612 of FIG. 6), fitter 124 uses this single returned parameter set as the best-fit binomial distribution for the net calls in queue, at step 214. If a linear combination of pairs of binomial distributions that eliminates error in the variance V of the distribution has been found (i.e., two or more parameter sets were returned from step 616 of FIG. 6), each such combination effects a composite error in the skewness, but the elements of each of these sets can be joined in a linear combination so as to effect a composite error of zero in the skewness. Therefore, fitter 124 proceeds to select the linear combinations that yield the smallest non-negative and the smallest non-positive errors in the skewness S (the third central moment), at step 216. This is shown in FIG. 7. For each parameter set of each linear combination, fitter 124 computes the skewness $S_B$ of that parameter set as $S_B=V_B(1-2P_B)$, at step 702, where $V_B$ is the binomial variance of that parameter set computed at step 602 of FIG. 6 and $P_B$ is the binomial probability of that parameter set computed at step 530 of FIG. 5. Then, for each linear combination, fitter 124 computes the composite skewness $S_T$ as $S_T=W_{B,1}S_{B,1}+W_{B,2}S_{B,2}$, at step 704, where $W_{B,1}$ and $S_{B,1}$ are the weight and binomial skewness of one parameter set of the linear combination and $W_{B,2}$ and $S_{B,2}$ are the weight and binomial skewness of the second parameter set of the linear combination. If there is only one linear combination (i.e., only two parameter sets were returned at step 612 of FIG. 6), as determined at step 706, no selection need be made, and fitter 124 returns the parameter sets of that linear combination, at step 720. If there is more than one linear combination, fitter 124 checks, at step 708, whether the composite skewness $S_T$ of any of the linear combinations is less than or equal to the skewness S of the distribution that was computed at step 306 of FIG. 3. If not, fitter 124 selects the linear combination that yields the smallest composite skewness $S_T$, at step 710, and returns the parameter sets of that linear combination, at step 720. If the composite skewness $S_T$ of at least one of the linear combinations is less than or equal to the skewness S of the distribution, fitter 124 checks, at step 712, whether the composite skewness $S_T$ of any of the linear combinations is greater than or equal to the skewness S of the distribution. If not, fitter 124 selects the linear combination that yields the largest composite skewness $S_T$, at step 714, and returns the parameter sets of that linear combination, at step 720. If the composite skewness $S_T$ of at least one of the linear combinations is greater than or equal to the skewness S of the distribution, fitter 124 selects the linear combination that yields the smallest composite skewness $S_T$ that is greater than or equal to the skewness S of the distribution, at step 716, and also selects the linear combination that yields the largest composite skewness $S_T$ that is less than or equal to the skewness S of the distribution, at step 718, and returns the parameter sets of the two selected linear combinations and their weights, at step 720.

Figure 8:
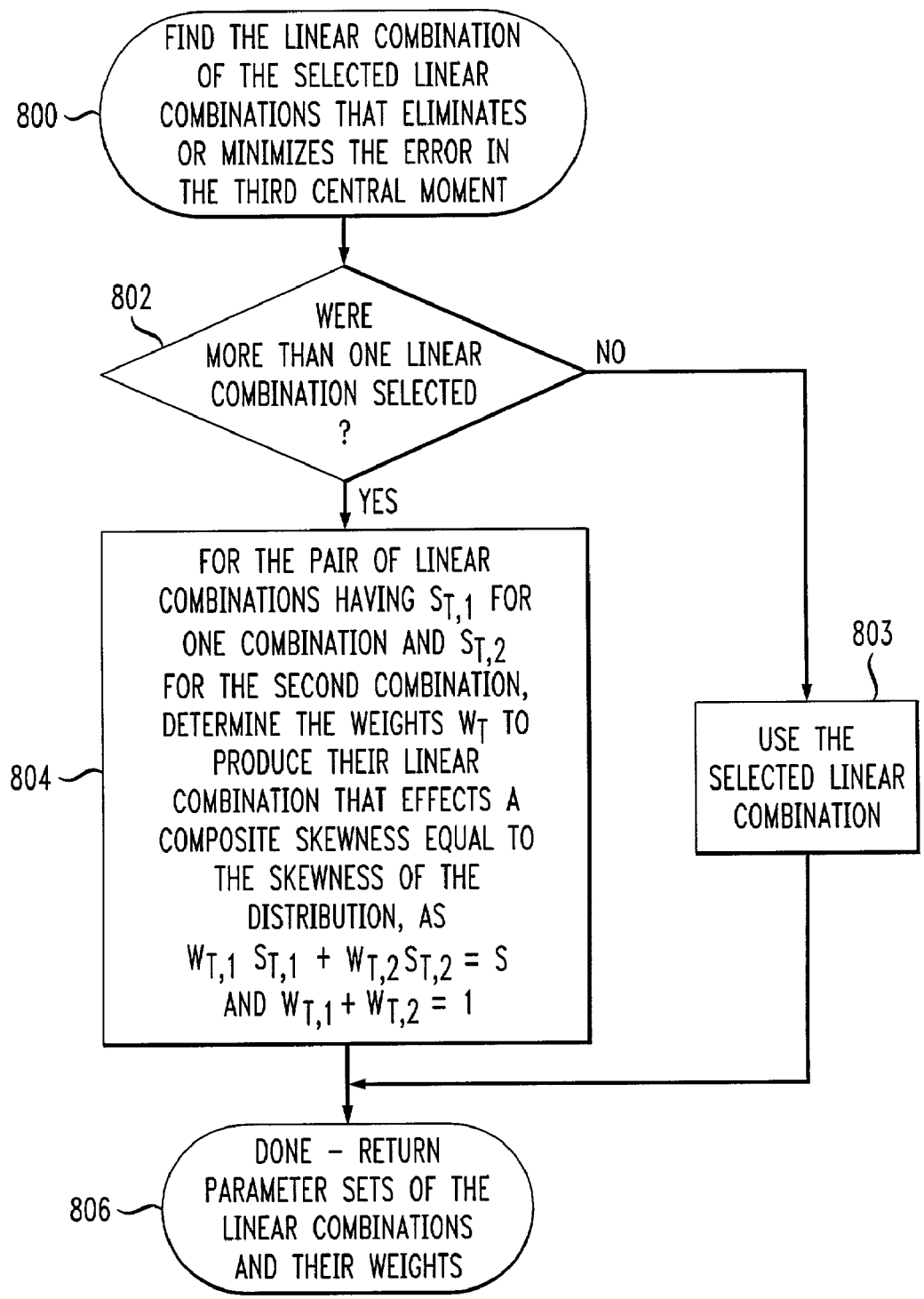

Having at least one linear combination that yields the smallest errors in the third central moment, fitter 124 proceeds to find a linear combination of those linear combinations that eliminates or minimizes the error in the third central moment, at step 218 of FIG. 2. This is shown in FIG. 8. Fitter 124 first checks if more than one linear combination was selected, i.e., returned at step 720 of FIG. 7, at step 802. If not, fitter 124 merely proceeds to use the one selected linear combination, at step 803, and returns its parameter sets and their weights, at step 806. If two linear combinations were selected, fitter 124 determines the composite weights $W_{T,1}$ and $W_{T,2}$ of their linear combination that make their composite skewness equal to the distribution's skewness S, at step 804. The linear combination of the linear combinations is expressed as $W_{T,1}S_{T,1}+W_{T,2}S_{T,2}=S$ and, where $0 \leq W_T \leq 1$ and $W_{T,1}+W_{T,2}=1$. Hence, the weights $W_T$ are expressed as $W_{T,1}=(S-S_{T,2})/(S_{T,1}-S_{T,2})$ and $W_{T,2}=1-W_{T,1}$. Fitter 124 then returns the parameter sets of the one or two linear combinations and their composite weights, at step 806.

Figure 9:
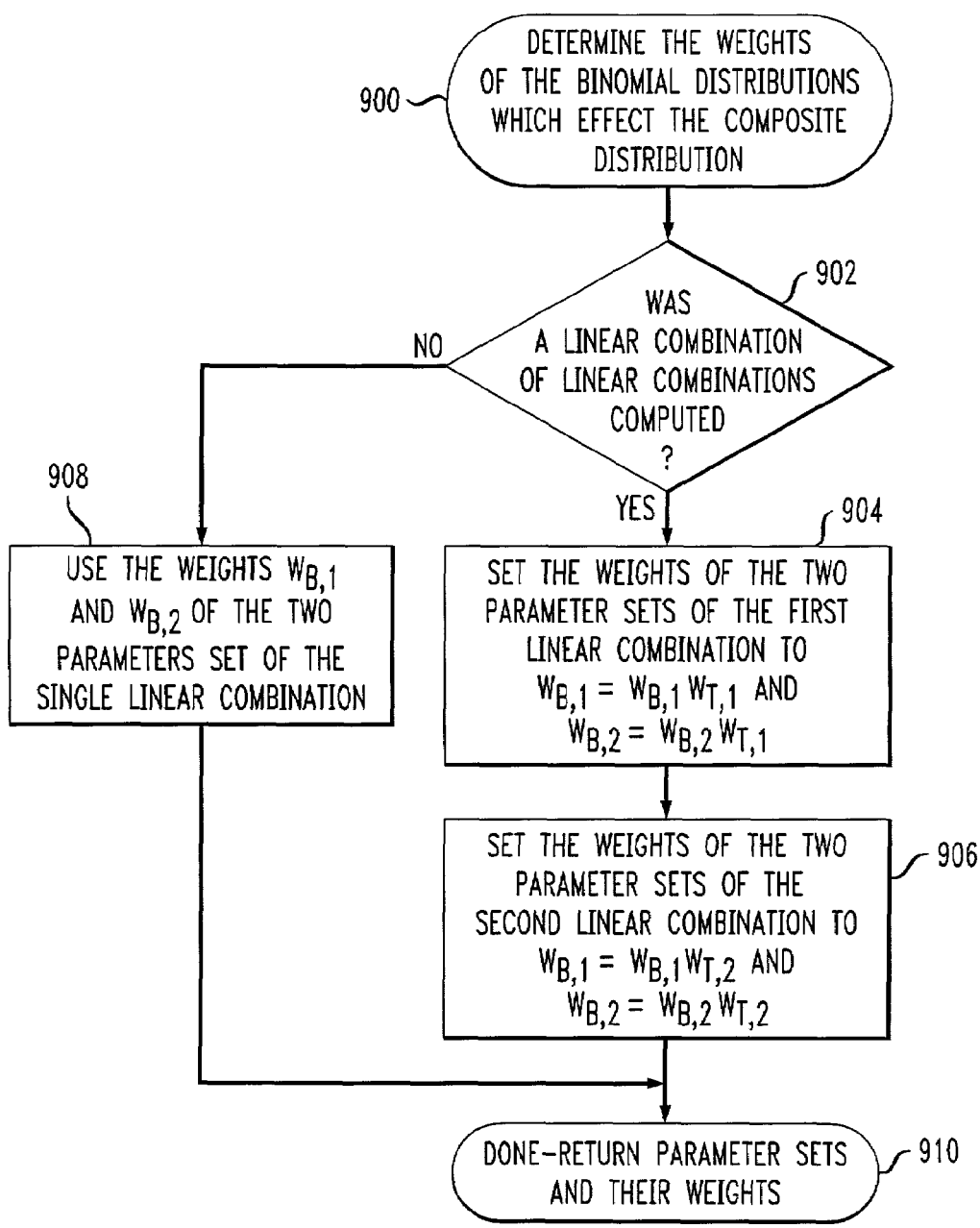

Fitter 124 now proceeds to determine the weights of the individual binomial distributions which effect the composite distribution, at step 220 of FIG. 2. That is, it decomposes the composite weights returned by FIG. 8 to get the elementary weights of the individual offset binomial distributions. This is shown in FIG. 9. Fitter 124 checks whether a linear combination of linear combinations was computed (at step 804 of FIG. 8), at step 902. If so, it recomputes the weight of each of the two parameter sets of the first linear combination as the product of the previously-computed weight of the parameter set and the first weight of the linear combination of linear combinations (i.e., $W_{B,1}=W_{B,1}W_{T,1}$ and $W_{B,2}=W_{B,2}W_{T,1}$), at step 904, and recomputes the weight of each of the two parameter sets of the second linear combination as the product of the previously-computed weight of the parameter set and the second weight of the linear combination of linear combinations (i.e., $W_{B,1}=W_{B,1}W_{T,2}$ and $W_{B,2}=W_{B,2}W_{T,2}$), at step 906. If a linear combination of linear combinations was not computed, as determined at step 902, fitter 124 proceeds to use the weights $W_{B,1}$ and $W_{B,2}$ that were previously computed for the two parameter sets of the single linear combination, at step 908. This is the equivalent of setting $W_{T,1}=1$ and $W_{T,2}=0$ in steps 904 and 906. Following step 906 or 908, fitter 124 returns the resulting parameter sets and their (newly-computed) weights which make the variance and skewness of their linear combination equal to the variance and skewness, respectively, of the distribution, at step 910.

Figure 10:
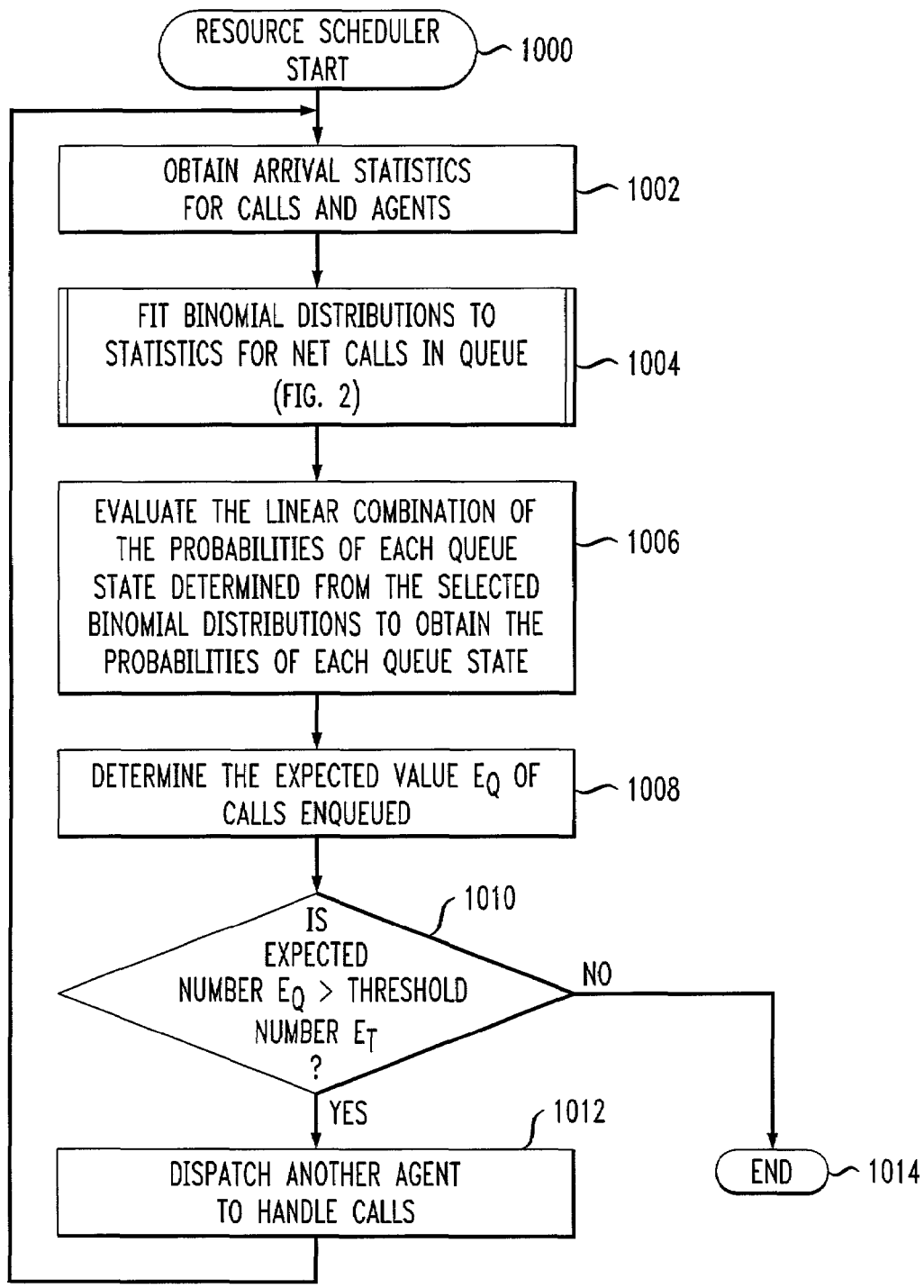
FIG. 10 is a functional diagram of a resource scheduler of the queued task/queued resource state forecaster of the call center of FIG. 1.

The computations of FIG. 2 can be used to determine the probability of any desired queue state. One can thus explore "what if" scenarios, using their probabilities as forecasts of service level to make decisions about managing the call center. For example, FIG. 2 may be used in a resource scheduler 128 to determine when a call-management system has a shortage of agents and needs more agents. Resource scheduler 128 uses the fit to the call-arrival and agent-arrival statistics to determine the expected value of calls that will be enqueued at the end of the horizon time period h. If this expected value of enqueued calls is greater than some selected threshold value, then another agent may be dispatched to the call-management system. For example, over a period of time a threshold value of 0.4 could be used to attempt to maintain the average number of queued calls at less than about 40% of the number of arriving calls. More precisely, it means that the average number of calls in queue is not to exceed 0.4 calls. Resource scheduler 128 is illustrated in FIG. 10.

Scheduler 128 may be invoked either periodically or in response to agent-arrival events (e.g., an agent logging in, logging out, or completing a task). Upon start of its execution, at step 1000, scheduler 128 obtains the arrival statistics for calls and agents that are needed for the computations of FIG. 3, at step 1002. Then scheduler 128 performs the fit of binomial distributions to the statistics according to the method of FIG. 2, at step 1004. Using the results produced by FIG. 2, scheduler 128 evaluates the linear combination of the probabilities of each queue state determined from the selected binomial distributions, at step 1006. Scheduler 128 uses $$P(k) = \frac{n! p^k (1-p)^{n-k}}{k!(n-k)!},$$

where P(k) is the probability of the queue state of (k+O) net calls in queue where O is the offset parameter (see steps 506 or 508 of FIG. 5), to obtain the probability of each queue state. For each queue state, it applies the weight of each binomial distribution to each corresponding probability determined by the binomial distribution for the state. For each queue state, it then computes the probability of occurrence as the sum of the weighted probabilities given by each binomial distribution. Scheduler 128 extracts from these results the probability $P_1$ of one call being enqueued, the probability $P_2$ of two calls being enqueued, the probability $P_3$ of three calls being enqueued, etc., up to the probability $P_m$ of m calls being enqueued which either evaluates to zero, or is sufficiently small, or is the maximum of the sum of the number of trials parameter and the corresponding offset parameter of the binomial distributions used in the fit. Scheduler 128 uses these probabilities to determine the expected value $E_Q$ of calls waiting in queue, at step 1008, by weighting each of the computed probabilities by its respective number of enqueued calls and summing the weighted probabilities. That is, $$E_Q = \sum_{i=1}^{m} i P_i.$$

Scheduler 128 now checks whether the expected value $E_Q$ exceeds the threshold value $E_T$, at step 1010. If so, scheduler 128 dispatches another agent to handle calls, at step 1012, and returns to step 1002 to determine if yet more agents need to be dispatched; if not, the operation of scheduler 128 ends, at step 1014.

The like scheduler, using another threshold parameter, may be used to decide when an agent can be released from processing calls to perform other work.

Figure 11:
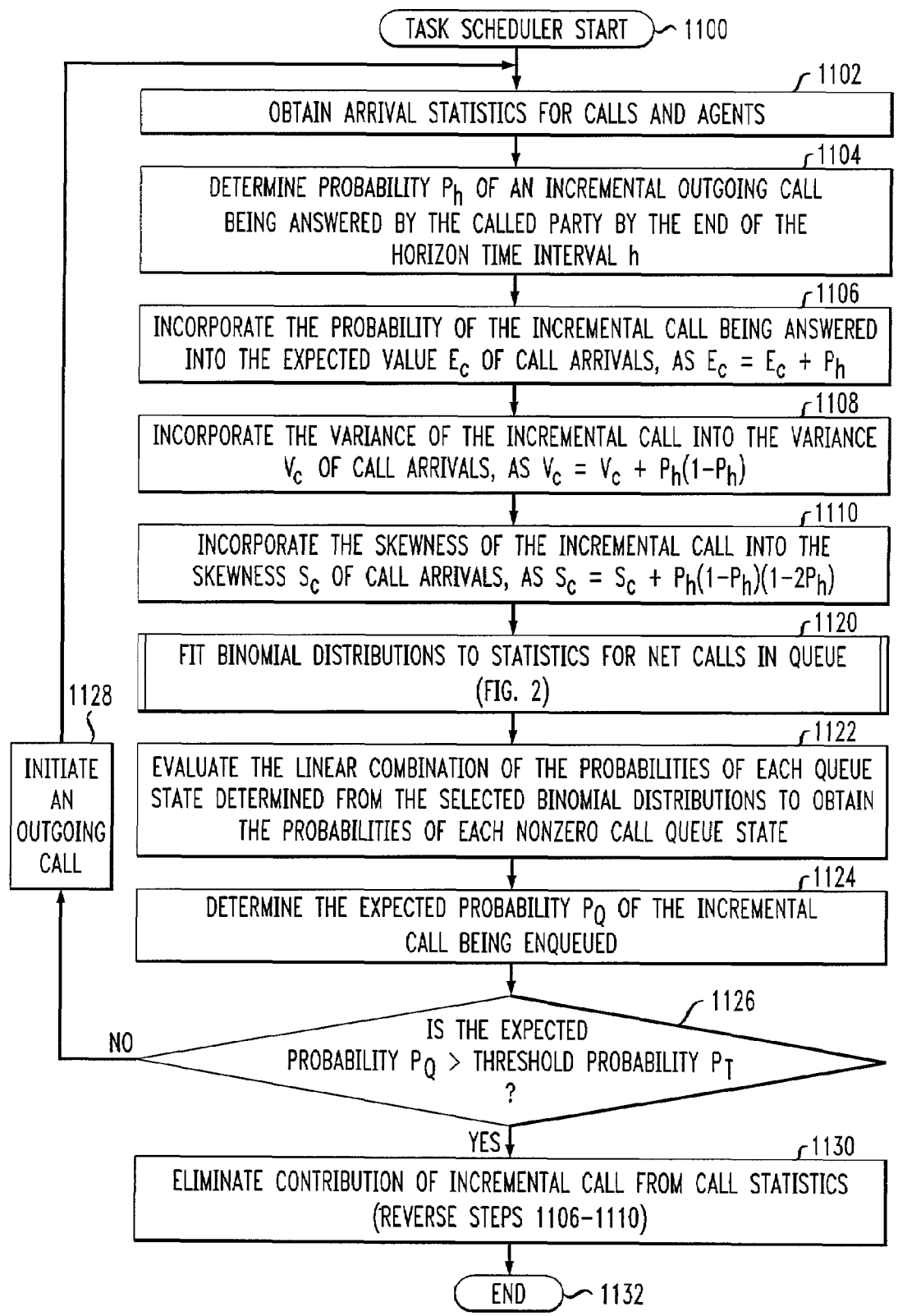
FIG. 11 is a functional diagram of a task scheduler of the queued task/queued resource state forecaster of the call center of FIG. 1.

For another example, FIG. 2 may be used in a task scheduler 126 to determine whether a new outbound call may or may not be initiated by the call-management system. Scheduler 126 uses the fit to the arrival statistics to determine the probability of a called party being enqueued because no agent is available to service the call at the end of the horizon time h. If this probability is greater than some threshold probability, scheduler 120 refrains from initiating an outbound call. For example a threshold probability of 0.01 would be used to limit the percentage of called parties who are not serviced without delay to one percent. Task scheduler 126 is illustrated in FIG. 11.

Scheduler 126 may be invoked either periodically or in response to agent-arrival events or call-completion events. Upon start of its execution, at step 1100, scheduler 126 obtains the arrival statistics for calls and agents that are needed for the computations of FIG. 3, at step 1002. Scheduler 126 then determines the probability $P_h$ of an incremental outgoing call being answered by the called party by the end of the horizon time interval, at step 1104. This is illustratively determined as described in U.S. application Ser. No. 09/872,188, filed on Jun. 1, 2001, entitled "Arrangement For Forecasting Timely Completion Of A Task By A Resource", which is hereby incorporated herein by reference. Scheduler 126 then incorporates this probability $P_h$ into the expected value $E_c$ of call arrivals (see step 302 of FIG. 3) by incrementing $E_c$ by $P_h$, at step 1106, incorporates the variance of the incremental call into the variance $V_c$ of call arrivals (see step 304 of FIG. 3) by incrementing $V_c$ by $P_h(1-P_h)$, at step 1108, and incorporates the skewness of the incremental call into the skewness $S_c$ of call arrivals (see step 306 of FIG. 3) by incrementing $S_c$ by $P_h(1-P_h)(1-2P_h)$, at step 1110. Scheduler 126 then performs the fit of binomial distributions to the statistics according to the method of FIG. 2, at step 1120. Using the results produced by FIG. 2, scheduler 126 now evaluates the linear combination of the probabilities of each queue state determined from the selected binomial distributions (see description of step 1006 of FIG. 10), to obtain the probabilities of each nonzero call queue state, at step 1122. Scheduler 126 extracts from these results the probability $P_1$ of one call being enqueued, the probability $P_2$ of two calls being enqueued, the probability $P_3$ of three calls being enqueued, etc., up to the probability $P_m$ of m calls being enqueued, where m is the maximum of the sum of the number of trials parameter and the corresponding offset parameter of the binomial distributions used in the fit. Scheduler 126 then uses these probabilities to determine the expected probability $P_Q$ of an outgoing call being enqueued, at step 1124, by summing the computed probabilities. That is, $$P_Q = \sum_{i=1}^{m} P_i.$$

Scheduler 126 now checks whether the expected probability $P_Q$ exceeds the threshold probability $P_T$, at step 1126. If not, scheduler 126 initiates an outgoing call, at step 1128, and returns to step 1102 to determine if yet more outgoing calls can be dispatched; if so, scheduler 126 eliminates the contribution of the incremental call from the call statistics, (i.e., reverses steps 1106–1110), at step 1130, and ends its operation, at step 1132.

Of course, various changes and modifications to the illustrative embodiment described above will be apparent to those skilled in the art. For example, scheduler threshold values may instead be placed on the expected number of enqueued calls, the expected number of waiting agents, a ratio of the expected number of enqueued calls to the expected number of waiting agents, the queuing rate, expected answer delay, percentage of agent utilization, ratio of expected number of calls enqueued to expected call traffic rate, ratio of the probability of zero calls enqueued to the probability of zero agents enqueued, ratio of the probability of at least one call enqueued to the probability of at least one agent enqueued, abandonment rates, various estimates of service level, etc. Such changes and modifications can be made without departing from the spirit and the scope of the invention and without diminishing its attendant advantages. It is therefore intended that such changes and modifications be covered by the following claims except insofar as limited by the prior art.

What is claimed is:

1. A method of operating a communication system comprising:
   obtaining arrival statistics for tasks and resources in the system;
   determining moments for tasks in queue from the obtained arrival statistics;
   determining a binomial distribution corresponding to the moments;
   fitting the determined moments to a linear combination of binomial distributions to obtain a composite binomial distribution;
   evaluating the composite binomial distribution to obtain an expected number of enqueued tasks or resources at the a future point in time; and
   adjusting operation of the system based on the expected number.

2. The method of claim 1 wherein:
   determining moments comprises:
   determining a mean, a variance, and a skewness for the tasks in queue
   determining a binomial distribution comprises
   determining ideal parameters of the binomial distribution that fit the moments, and
   determining from the ideal parameters at least one set of realistic parameters of the binomial distribution that fit the mean; and
   fitting comprises:
   determining any linear combinations of pairs of binomial distributions having the realistic parameters that eliminate error in the variance,
   selecting any said linear combinations that yield the smallest errors in the skewness,
   determining any linear combination of the selected linear combinations that minimize error in the skewness, and
   determining weights of the binomial distributions of the selected linear combinations that effect the composite binomial distribution.

3. The method of claim 1 wherein:
   determining moments comprises:
   computing each moment as a function of that moment for task arrivals and that moment for resource arrivals at the system.

4. The method of claim 2 wherein:
   determining the mean comprises:
   computing the mean as the mean of task arrivals less the mean of resource arrivals at the system.

5. The method of claim 4 wherein:
   the mean of task arrivals comprises expected numbers of incoming calls and answered outgoing calls; and
   the mean of resource arrivals comprises probabilities of individual agents becoming available by the future point in time.

6. The method of claim 2 wherein:
   determining the variance comprises:
   computing the variance as variance of call arrivals plus variance of agent arrivals at the system.

7. The method of claim 6 wherein:
   the variance of call arrivals comprises a sum of variances in arrival for individual calls, and
   the variance of agent arrivals comprises a sum of variances in arrival of individual agents.

8. The method of claim 2 wherein:
   determining the skewness comprises:
   computing the skewness as skewness of call arrivals less skewness of agent arrivals at the system.

9. The method of claim 8 wherein:
   the skewness of call arrivals comprises a sum of skewnesses of arrival of individual calls, and
   the skewness of agent arrivals comprises a sum of skewnesses of arrival of individual agents.

10. The method of claim 2 wherein:
    determining ideal parameters comprises
    determining an ideal probability of success, an ideal number of trials, and an ideal offset from the moments.

11. The method of claim 10 wherein
    determining at least one set of realistic parameters comprises
    determining at least one set of a probability of success, an integer number of trials, and an integer offset from the moments.

12. The method of claim 11 wherein:
    determining any linear combinations of pairs of binomial distributions comprises
    selecting the realistic parameter set having the largest variance if no realistic parameter set has a variance greater than or equal to the variance of the distribution;
    selecting the realistic parameter set having the smallest variance if no realistic parameter set has a variance less than or equal to the variance of the distribution;

else determining each pair of realistic parameter sets one of which has the variance greater than or equal to the variance of the distribution and another of which has the variance less than or equal to the variance of the distritubion, and determining weights of each pair of realistic parameter sets that cause their composite variance to equal the variance of the distribution.

13. The method of claim 12 wherein:

selecting any said linear combinations comprises if a pair of realistic parameters sets was determined, for each said pair of realistic parameter sets determining a composite skewness of the sets' individual skewnesses;

if there is only one pair of realistic parameter sets, selecting that pair;

if there is no pair of realistic parameter sets having a composite skewness less than or equal to the skewness of the distribution, selecting a pair of realistic parameter sets having a smallest composite skewness;

if there is no pair of realistic parameter sets having a composite skewness greater than or equal to the skewness of the distribution, selecting a pair of realistic parameter sets having a largest composite skewness;

else selecting two pairs of realistic parameter sets comprising a pair of realistic parameter sets having a largest composite skewness and a pair of realistic parameters sets having a smallest composite skewness.

14. The method of claim 13 wherein:

determining any linear combination of the selected linear combinations comprises if two pairs of realistic parameter sets were selected, determining weights of the two pairs of sets that effect a composite skewness of the two pairs that equals the skewness of the distribution.

15. The method of claim 14 wherein:

determining weights of the binomial distributions comprises if two pairs of realistic parameter sets were selected, determining, from the weights of the two pairs of sets, weights of the four sets of realistic parameters that effect the composite binomial distribution.

16. The method of claim 15 wherein:

evaluating the composite binomial distribution comprises evaluating a binomial distribution having the selected realistic parameter set if a pair of realistic parameter sets was not determined;

evaluating binomial distributions having the selected pair of realistic parameter sets if two pairs of realistic parameter sets were not selected; and evaluating binomial distributions having the four sets of realistic parameter sets if two pairs of realistic parameter sets were selected.

17. An apparatus that performs the method of one of claims 1–16.

18. A computer-readable medium containing instructions which, when executed in a computer, cause the computer to perform the method of one of claims 1–16.

19. A communication controller comprising:

means for obtaining arrival statistics for tasks and resources in the system;

means for determining moments for the tasks in queue from the obtained arrival statistics;

means for determining a binomial distribution corresponding to the moments;

means for fitting the determined moments to a linear combination of binomial distributions to obtain a composite binomial distribution;

means for evaluating the composite binomial distribution to obtain an expected number of enqueued tasks or resources at the a future point in time; and means for adjusting operation of the system based on the expected number.

20. A method of operating a communication system comprising:

obtaining arrival statistics for tasks and resources in the system;

determining moments for the tasks in queue from the obtained arrival statistics;

adjusting the determined moments by a probability of one of an additional task and an additional resource arriving by the a future point in time;

determining a binomial distribution corresponding to the adjusted moments;

fitting the determined adjusted moments to a linear combination of binomial distributions to obtain a composite binomial distribution;

evaluating the composite binomial distribution to obtain a probability of the additional task or resource being enqueued by the future point in time; and adjusting operation of the system based on the probability obtained by evaluating the composite binomial distribution.

21. The method of claim 20 wherein:

determining moments comprises determining a mean, a variance, and a skewness for the net tasks in queue;

determining a binomial distribution comprises determining ideal parameters of the binomial distribution that fit the adjusted moments, and determining from the ideal parameters at least one set of realistic parameters of the binomial distribution that fit the adjusted mean; and fitting comprises determining any linear combinations of pairs of binomial distributions having the realistic parameters that eliminate error in the adjusted variance, selecting any said linear combinations that yield the smallest errors in the adjusted skewness, determining any linear combination of the selected linear combinations that minimize error in the adjusted skewness, and determining weights of the binomial distributions of the selected linear combinations that effect the composite binomial distribution.

22. The method of claim 20 wherein:

determining moments comprises:

computing each moment as a function of that moment for task arrivals and that moment for resource arrivals at the system.

23. The method of claim 21 wherein:

determining the mean comprises:

computing the mean as the mean of task arrivals less the mean of resource arrivals at the system.

24. The method of claim 23 wherein:

the mean of task arrivals comprises expected numbers of incoming calls and answered outgoing calls; and the mean of resource arrivals comprises probabilities of individual agents becoming available by the future point in time.

25. The method of claim 21 wherein:

determining the variance comprises:

computing the variance as variance of call arrivals plus variance of agent arrivals at the system.

26. The method of claim 25 wherein:
the variance of call arrivals comprises a sum of variances in arrival for individual calls, and
the variance of agent arrivals comprises a sum of variances in arrival of individual agents.

27. The method of claim 21 wherein:
determining the skewness comprises:
computing the skewness as skewness of call arrivals less skewness of agent arrivals at the system.

28. The method of claim 27 wherein:
the skewness of call arrivals comprises a sum of skewnesses of arrival of calls, and
the skewness of agent arrivals comprises a sum of skewnesses of arrival of individual agents.

29. The method of claim 21 wherein:
determining ideal parameters comprises
determining an ideal probability of success, and ideal number of trials, and an ideal offset from the adjusted moments.

30. The method of claim 29 wherein:
determining at least one set of realistic parameters comprises
determining at least one set of a probability of success, an integer number of trials, and an integer offset from the adjusted moments.

31. The method of claim 30 wherein:
determining any linear combinations of pairs of binomial distributions comprises
selecting the realistic parameter set having the largest variance if no realistic parameter set has a variance greater than or equal to the adjusted variance of the distribution;
selecting the realistic parameter set having the smallest variance if no realistic parameter set has a variance less than or equal to the adjusted variance of the distrubion;
else determining each pair of realistic parameter sets one of which has the variance greater than or equal to the adjusted variance of the binomial distribution and another of which has the variance less than or equal to the adjusted variance of the distribution, and
determining weights of each pair of realistic parameter sets that cause their composite variance to equal the adjusted variance of the distribution.

32. The method of claim 31 wherein:
selecting any said linear combinations comprises:
if a pair of realistic parameter sets was determined, for each said pair of realistic parameter sets determining a composite skewness of the sets' individual skewnesses;
if there is only one pair of realistic parameter sets, selecting that pair;
if there is no pair of realistic parameter sets having a composite skewness less than or equal to the adjusted skewness of the distribution, selecting a pair of realistic parameter sets having a smallest composite skewness;
if there is no pair of realistic parameter sets having a composite skewness greater than or equal to the adjusted skewness of the distribution, selecting a pair of realistic parameter sets having a largest composite skewness;
else selecting two pairs of realistic parameter sets comprising pair of realistic parameter sets having a largest composite skewness an a pair of realistic parameters sets having a smallest composite skewness.

33. The method of claim 32 wherein:
determining any linear combination of the selected linear combinations comprises
if two pairs of realistic parameter sets were selected, determining weights of the two pairs of sets that effect a composite skewness of the two pairs that equals the adjusted skewness of the distribution.

34. The method of claim 33 wherein:
determining weights of the binomial distributions comprises
if two pairs of realistic parameter sets were selected, determining, from the weights of the two pairs of sets, weights of the four sets of realistic parameters that effect the composite binomal distribution.

35. The method of claim 34 wherein:
evaluating the composite binomial distribution comprises
evaluating the binomial distribution having the selected realistic parameter set if a pair of realistic parameter sets was not determined;
evaluating binomial distributions having the selected pair of realistic parameter sets if two pairs of realistic parameter sets were not selected; and
evaluating binomial distributions having the four sets of realistic parameter sets if two pairs of realistic parameter sets were selected.

36. An apparatus that performs the method of one of claims 20–35.

37. A computer-readable medium containing instructions which, when executed in a computer, cause the computer to perform the method of one of claims 20–35.

38. A communication controller comprising:
means for obtaining arrival statistics for tasks and resources in the system;
means for determining moments for the tasks in queue from the obtained arrival statistics;
means for adjusting the determined moments by a probability of one of an additional task and an additional resource arriving by the a future point in time;
means for determining a binomial distribution corresponding to the adjusted moments;
means for fitting the determined adjusted moments to a linear combination of binomial distributions to obtain a composite binomial distribution;
means for evaluating the composite binomial distribution to obtain a probability of the additional task or resource being enqueued by the a future point in time; and
means for adjusting operation of the system based on the probability obtained by evaluating the composite binomial distribution.

39. A method of operating a communication system comprising:
obtaining arrival statistics for tasks and resources in the system;
determining moments for the tasks in queue from the obtained arrival statistics;
determining a binomial distribution corresponding to the moments;
fitting the determined moments to a linear combination of binomial distributions to obtain a composite binomial distribution;
evaluating the composite binomial distribution to obtain an expected number of enqueued resources at the a future point in time; and adjusting operation of the system based on the expected number.

* * * * *